(12) United States Patent
Kim (10) Patent No.: US 12,337,639 B2
(45) Date of Patent: Jun. 24, 2025

(54) SUSPENSION MOUNT STRUCTURE OF ELECTRIC VEHICLE AND PERFROMANCE EVALUATING METHOD FOR THE SAME

(71) Applicant: PUKYONG NATIONAL UNIVERSITY INDUSTRY-UNIVERSITY COOPERATION FOUNDATION, Busan (KR)

(72) Inventor: Chan-Jung Kim, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 427 days.

(21) Appl. No.: 17/868,965

(22) Filed: Jul. 20, 2022

(65) Prior Publication Data

US 2023/0066515 A1 Mar. 2, 2023

(30) Foreign Application Priority Data

Aug. 25, 2021 (KR) .......................... 10-2021-0112215

(51) Int. Cl.
*G01M 17/04* (2006.01)
*B60G 13/16* (2006.01)

(52) U.S. Cl.
CPC .......... *B60G 13/16* (2013.01); *B60G 2202/25* (2013.01); *B60G 2300/50* (2013.01); *B60G 2400/252* (2013.01); *B60G 2400/91* (2013.01); *G01M 17/04* (2013.01)

(58) Field of Classification Search
CPC ................ B60G 13/16; B60G 2202/25; B60G 2300/50; B60G 2400/252; B60G 2400/91; B60G 2206/99; B60G 15/063; B60G 2204/10; G01M 17/04; Y02T 10/62; B60Y 2200/91
See application file for complete search history.

(56) References Cited

U.S. PATENT DOCUMENTS

| 7,406,371 | B2 * | 7/2008 | Izawa | B60G 17/0182 280/5.515 |
| 8,892,280 | B2 * | 11/2014 | Kinoshita | B60W 10/06 701/1 |
| 9,187,080 | B2 * | 11/2015 | Kikuchi | B60W 10/04 |
| 10,315,479 | B2 * | 6/2019 | Ranjan | F16F 9/462 |

(Continued)

FOREIGN PATENT DOCUMENTS

| JP | H08312712 | 11/1996 |
| KR | 10-1824810 | 1/2018 |

*Primary Examiner* — Freddie Kirkland, III
(74) *Attorney, Agent, or Firm* — NORTON ROSE FULBRIGHT US LLP (57) ABSTRACT

Disclosed are a suspension mount structure of an electrified vehicle and a method for evaluating performance thereof. The suspension mount structure includes an upper structure of the electrified vehicle; and a suspension on which the upper structure is mounted, wherein vibration occurring at a location below the suspension is transmitted to the suspension via an axle and then is transmitted to the upper structure via the suspension, wherein the suspension includes a spring and a damper, wherein the spring and the damper are connected in series to each other and are connected in series to the upper structure.

5 Claims, 6 Drawing Sheets

(56) References Cited

U.S. PATENT DOCUMENTS

| | | | | |
|---|---|---|---|---|
| 10,427,487 B2* | 10/2019 | Yoshimi | ............... | B60G 17/018 |
| 11,072,220 B2* | 7/2021 | Conti | ..................... | B60G 15/06 |
| 11,124,035 B1* | 9/2021 | Hall | .................. | B60G 17/0157 |
| 11,326,664 B2* | 5/2022 | Oblizajek | .......... | B60G 17/0165 |
| 2013/0341143 A1* | 12/2013 | Brown | .................... | F16F 7/104 |
| | | | | 188/380 |
| 2020/0386292 A1* | 12/2020 | Oblizajek | ................ | F16F 9/18 |

* cited by examiner

SUSPENSION MOUNT STRUCTURE OF ELECTRIC VEHICLE AND PERFROMANCE EVALUATING METHOD FOR THE SAME

CROSS-REFERENCE TO RELATED APPLICATION

This application claims a benefit under 35 U.S.C. § 119(a) of KR Patent Application No. 10-2021-0112215 filed Aug. 25, 2021, the entire disclosure of which is incorporated herein by reference for all purposes.

BACKGROUND

I. Field of the Invention

The present disclosure relates to a suspension mount structure of an electrified vehicle and a method for evaluating performance thereof. More particularly, the present disclosure relates to a suspension mount structure of an electrified vehicle capable of improving vibration insulation characteristics of the electrified vehicle having vibration characteristics different from that of a conventional internal combustion engine vehicle, and a method for evaluating performance thereof.

II. Description of Related Art

Unlike an internal combustion engine vehicle that obtains driving energy by burning fossil fuels, an electrified vehicle drives by rotating a motor with electric power stored in a battery. The electrified vehicle does not have an engine and a transmission which are the most important parts of the conventional internal combustion engine vehicle, but includes parts related to electric power. For example, the electrified vehicle includes a driving motor, a speed reducer, a battery, an on-board charger (OBC), EPCU (Electric Power Control Unit), etc.

The drive motor converts electrical energy into kinetic energy to drive wheels. The speed reducer is of a type of transmission that efficiently transmits power to the wheels according to characteristics of the motor. The speed reducer reduces a revolution per minute (RPM) of the motor to a required level to obtain a higher torque.

The battery stores therein electrical energy. The EPCU improves efficiency by integrating units that control power in the vehicle. The EPCU is composed of an inverter, LDC (low voltage DC-DC converter), and VCU (vehicle control unit).

The inverter controls the speed of the motor by converting DC power of the battery into AC power. The inverter takes charge of acceleration and deceleration commands to increase operability of the electrified vehicle. LDC denotes a device that converts voltage of a high-voltage battery into a low-voltage (12V) and supplies the low-voltage power to an electric system. The battery uses a high voltage, while the electric system of the vehicle uses a low voltage. Thus, the LDC denotes required for an operation of the electric system. The VCU controls a power controller in the vehicle. The VCU controls vehicle power, for example, performs motor control, regenerative braking control, air conditioning load control, and electric load power supply control.

The OBC converts external AC power to DC power to charge the battery.

The electrified vehicle uses the motor as a driver device. Thus, noise and vibration of the vehicle itself hardly occurs unlike the internal combustion engine vehicle that uses a conventional engine as a driver device. Therefore, a suspension mount structure of the electrified vehicle should be designed to have a new structure based on characteristics of the electrified vehicle, unlike the existing internal combustion vehicle.

A. Prior Art Literature

Korean Patent No. 10-1824810 (2018.01.26) pages 3 to 5.

SUMMARY OF THE INVENTION

This summary is provided to introduce a selection of concepts in a simplified form that are further described below in the detailed description. This summary is not intended to identify all key features or essential features of the claimed subject matter, nor is it intended to be used alone as an aid in determining the scope of the claimed subject matter.

A purpose of the present disclosure is to provide a suspension mount structure of an electrified vehicle that may improve vibration insulation properties of an electrified vehicle having vibration characteristics different from that of a conventional internal combustion engine vehicle, and a method for evaluating performance thereof.

A purpose of the present disclosure is to provide a suspension mount structure of an electrified vehicle in which vibration transmissibility is greatly reduced only with small damper performance, so that a larger design space for a damper may be secured, and to which an electronic damper may be applied, and a method for evaluating performance of the suspension mount structure.

A purpose of the present disclosure is to provide a suspension mount structure of an electrified vehicle which may effectively reduce vibrations resulting from a road surface with small damper performance, and a method for evaluating performance of the suspension mount structure.

Performance of a damper is proportional to a damper manufacturing cost or a required space thereof. Thus, a purpose of the present disclosure is to provide a suspension mount structure of an electrified vehicle in which a compact damper is disposed to minimize a vehicle manufacturing cost and a required space of the damper, and a method for evaluating performance of the suspension mount structure.

Purposes in accordance with the present disclosure are not limited to the above-mentioned purpose. Other purposes and advantages in accordance with the present disclosure as not mentioned above may be appreciated from following descriptions and more clearly appreciated from embodiments in accordance with the present disclosure. Further, it will be readily appreciated that the purposes and advantages in accordance with the present disclosure may be realized by features and combinations thereof as disclosed in the claims.

A first aspect of the present disclosure provides a suspension mount structure of an electrified vehicle, the suspension mount structure comprising: an upper structure of the electrified vehicle; and a suspension on which the upper structure is mounted, wherein vibration occurring at a location below the suspension is transmitted to the suspension via an axle and then is transmitted to the upper structure via the suspension, wherein the suspension includes a spring and a damper, wherein the spring and the damper are connected in series to each other and are connected in series to the upper structure.

In one implementation of the first aspect, vibration transmissibility of the suspension is determined based on a following Equation 1:

$$\frac{x(\omega)}{y(\omega)} = \frac{CK}{CK - MC\omega^2 - MK(\omega j)} \quad \text{(Equation 1)}$$

where M denotes an equivalent mass of the upper structure, C denotes a damping coefficient of the damper, K denotes a stiffness coefficient of the spring, w denotes an angular frequency (=2πf), and j denotes a complex number.

In one implementation of the first aspect, the vibration transmissibility means a ratio of vibration transmitted to the upper structure above the suspension to vibration occurring at a location below the suspension, while vibration occurring at a location above the suspension is ignored.

A second aspect of the present disclosure provides a method for evaluating performance of a suspension mount structure of an electrified vehicle, the method comprising: setting an equivalent mass of an upper structure of the electrified vehicle; mounting the upper structure on a suspension, wherein the suspension includes a spring and a damper connected in series to each other; setting a damping coefficient of the damper and a stiffness coefficient of the spring; setting vibration transmissibility of the suspension; applying the equivalent mass of the upper structure, and the damping coefficient and the stiffness coefficient of the suspension to the vibration transmissibility; and changing a frequency of input vibration input to the suspension to analyze change in vibration transmissibility of the suspension.

In one implementation of the second aspect, the vibration transmissibility of the suspension is determined based on a following Equation 1:

$$\frac{x(\omega)}{y(\omega)} = \frac{CK}{CK - MC\omega^2 - MK(\omega j)} \quad \text{(Equation 1)}$$

where M denotes an equivalent mass of the upper structure, C denotes a damping coefficient of the damper, K denotes a stiffness coefficient of the spring, w denotes an angular frequency (=2πf), and j denotes a complex number.

In one implementation of the second aspect, the analyzing of the change in the vibration transmissibility of the suspension further includes changing the damping coefficient of the suspension to analyze the change in the vibration transmissibility of the suspension.

The suspension mount structure of the electrified vehicle according to the present disclosure may improve vibration insulation properties of an electrified vehicle having vibration characteristics different from that of the conventional internal combustion engine vehicle.

According to the suspension mount structure of the electrified vehicle according to the present disclosure, vibration transmissibility is greatly reduced only with small damper performance, so that a larger design space for a damper may be secured.

The suspension mount structure of the electrified vehicle according to the present disclosure may effectively reduce vibrations resulting from a road surface with small damper performance.

The suspension mount structure of the electrified vehicle according to the present disclosure may include the compact damper to minimize a vehicle manufacturing cost and a required space of the damper.

In addition to the effects as described above, specific effects in accordance with the present disclosure will be described together with following detailed descriptions for carrying out the disclosure.

DETAILED DESCRIPTION OF PREFERRED EMBODIMENTS

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be appreciated that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be appreciated that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further appreciated that the terms "comprises," "comprising," "includes," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be appreciated that, although the terms "first," "second," "third," and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be appreciated that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be appreciated that when an element or layer is referred to as being "connected to", or "coupled to" another element or layer, it may be directly on, connected to, or coupled to the other element or layer, or one or more intervening elements or layers may be present. In addition, it will also be appreciated that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly appreciated by one of ordinary skill in the art to which this inventive concept belongs. It will be further appreciated that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a suspension mount structure of an electrified vehicle and a method for evaluating performance thereof according to the present disclosure will be described.

A suspension of a vehicle is located between a vehicle body and an axle, and plays a role in reducing vibration and shock transmitted to the vehicle body due to irregularities or steps of a road surface. The suspension allows the vehicle body to move up and down or move left and right when the vehicle turns or in sudden braking of the vehicle.

The suspension is composed of a spring and a damper. For example, a spring includes a steel plate spring, a coil spring, a torsion bar spring, an air spring, etc. The damper includes a shock absorber for preventing vibration, a hydropneumatic system, etc. In addition, the suspension includes a link device that regulates a relative position between the vehicle body and the axle, a stabilizer that adjusts heave balance of left and right axles, and an anti-roll system.

An operating environment of a suspension of a conventional internal combustion engine vehicle must consider vibrations occurring in an engine above the suspension in addition to vibrations transmitted via the axle from a road surface. On the contrary, unlike the internal combustion engine vehicle, in an operating environment of a suspension of an electrified vehicle, vibrations occurring at a part above the suspension may be relatively neglected, and only vibrations transmitted from an underlying road surface need to be considered. Further, in the electrified vehicle, a fairly large mass exists above the suspension. Therefore, a rigid body motion occurs under influence of the mass above the suspension and rigidity of the suspension. Thus, the operating environment of the electrified vehicle suspension must also consider an effect of resonance. The present disclosure proposes a structure of a suspension mount suitable for an electrified vehicle under assumption that the mass above the suspension of the electrified vehicle is a concentrated mass and characteristics of the suspension may be expressed based on a stiffness coefficient and a damping coefficient.

Figure 1:
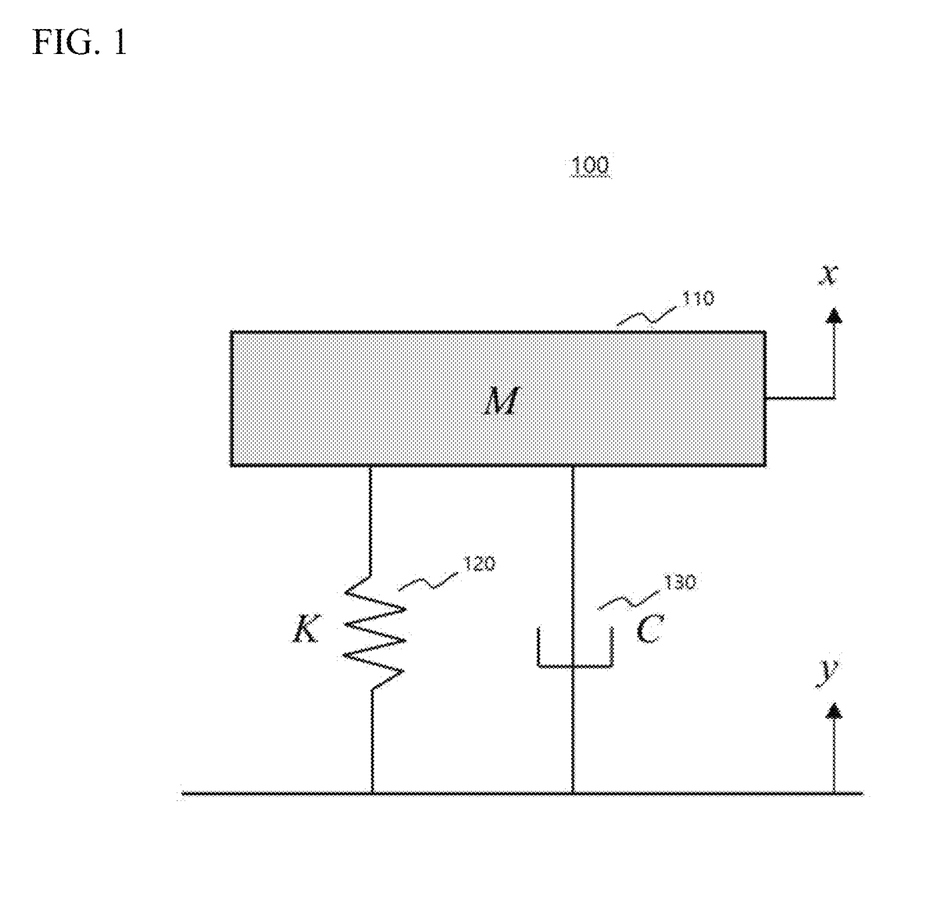
FIG. 1 is a conceptual representation of a suspension mount structure of a conventional internal combustion engine vehicle.

FIG. 1 is a diagram conceptually showing a suspension mount structure of a conventional internal combustion engine vehicle.

Referring to FIG. 1, in the suspension mount of the conventional internal combustion engine vehicle, conceptually, an upper structure (for example, a vehicle body 110) has an equivalent mass value of M, and a suspension includes a spring 120 and a damper 130 which are connected to in a parallel manner to the upper structure 110. The spring 120 of the suspension has a stiffness coefficient value of K, and the damper 130 has a damping coefficient value of C.

When vibration transmitted to the suspension from a portion below the suspension is an input y and vibration transmitted to the upper structure via the suspension is an output x, a governing equation of the suspension mount of the conventional internal combustion engine vehicle may be expressed as a following Equation 1.

$$Mx''+C(x'-y')+K(x-y)=0 \quad \text{(Equation 1)}$$

where M denotes the equivalent mass of the upper structure, K denotes the stiffness coefficient, C denotes the damping coefficient, $x''$ denotes a second order derivative of x, $x'$ denotes a first order derivative of x, and $y'$ denotes a first order derivative of y. The governing equation of the suspension mount of the conventional internal combustion engine vehicle may be expressed as a second order differential equation expressed as the above Equation 1.

Vibration transmissibility=x/y of the suspension mount may be expressed as a ratio of the output x to the input y. Using the above Equation 1, frequency component vibration transmissibility of the suspension mount in FIG. 1 may be calculated based on a following Equation 2.

$$\frac{x(\omega)}{y(\omega)} = \frac{C(\omega j) + K}{K - M\omega^2 - C(\omega j)} \quad \text{(Equation 2)}$$

where w denotes an angular frequency=2πf (f denotes a frequency (Hz)), and j denotes a complex number.

Figure 2:
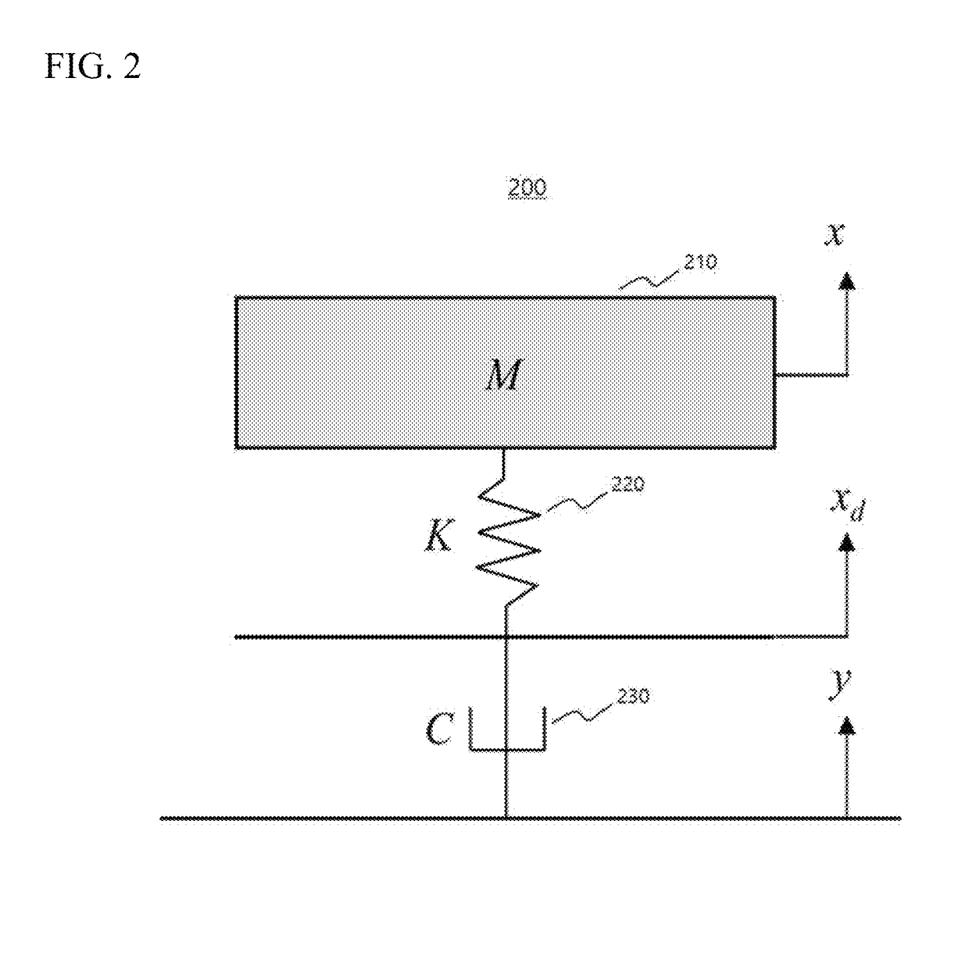
FIG. 2 is a diagram conceptually showing a suspension mount structure of an electrified vehicle according to one embodiment of the present disclosure.

FIG. 2 is a diagram conceptually showing a suspension mount structure of an electrified vehicle according to one embodiment of the present disclosure.

Referring to FIG. 2, the suspension mount of the electrified vehicle according to one embodiment of the present disclosure conceptually includes an upper structure (for example, a vehicle body 210) having an equivalent mass value of M, and a suspension including a spring 220 and a damper 230 which are connected in series to the upper structure 210. It is assumed that the spring 220 of the suspension has a stiffness coefficient value of K, and the damper 230 has a damping coefficient value of C.

When vibration transmitted to the suspension from a portion below the suspension is input y, vibration transmitted to the spring 220 via the damper 230 is $x_d$, and vibration transmitted to the upper structure 210 via the suspension is output x, a governing equation of the suspension mount of the electrified vehicle according to the present disclosure may be expressed as a following Equation 3.

$$Mx'' + K(x - x_d) = 0$$

$$C(x_d' - y') + K(x_d - x) = 0 \quad \text{(Equation 3)}$$

where M denotes an equivalent mass of the upper structure, K denotes the stiffness coefficient, C denotes the damping coefficient, x" denotes a second order derivative of x, x' denotes a first order derivative of x, and y' denotes a first order derivative of y, and $x_d'$ denotes a first order derivative of xd. A governing equation of the suspension mount of the electrified vehicle according to the present disclosure may be expressed as a second order differential equation of the above Equation 3.

Using the above Equation 3, frequency component vibration transmissibility of the suspension mount in FIG. 2 may be calculated based on a following Equation 4.

$$\frac{x(\omega)}{y(\omega)} = \frac{CK}{CK - MC\omega^2 - MK(\omega j)} \quad \text{(Equation 4)}$$

where w denotes angular frequency=2πf (f denotes frequency (Hz)), and j denotes a complex number.

Unlike the conventional internal combustion engine vehicle, the vibration transmissibility of Equation 4 represents a ratio of vibration transmitted to a portion above the suspension to vibration occurring at a portion below the suspension, while vibration occurring at a portion above the suspension is ignored.

Figure 3:
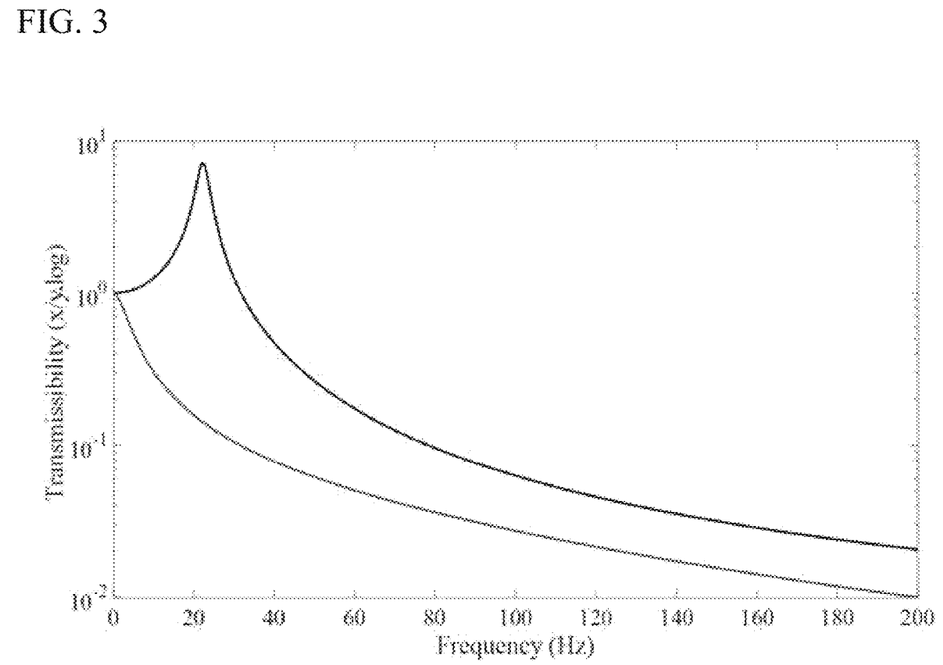
FIG. 3 is a diagram of a comparison result between vibration transmissibility of a suspension mount structure of a conventional internal combustion engine vehicle and that of a suspension mount structure according to the present disclosure.

FIG. 3 is a diagram of a comparison between vibration transmissibility of a suspension mount structure of a conventional internal combustion engine vehicle and vibration transmissibility of a suspension mount structure according to the present disclosure.

Referring to FIG. 3, a black line is a graph showing the vibration transmissibility (Equation 2) of the suspension mount of the conventional internal combustion engine vehicle of FIG. 1. A red line is a graph showing the vibration transmissibility (Equation 4) of the suspension mount of the electrified vehicle according to one embodiment of the present disclosure of FIG. 2. Vibration reduction performance of the suspension mount may be analyzed using the calculated vibration transmissibility.

In FIG. 3, an x-axis represents a frequency value of the input vibration, and a y-axis represents a vibration transmissibility value of the input vibration of the corresponding frequency. FIG. 3 is a result of calculating the vibration transmissibility when the equivalent mass (M) value of the upper structure is set to 50 Kg, the stiffness coefficient (K) value is set to 1,000 KN/m, and the damping coefficient (C) value is set to 1,000 Ns/m.

It may be identified that based on the vibration transmissibility of the suspension mount of the conventional internal combustion engine vehicle in FIG. 3, a frequency of about 22.5 Hz is a resonance point in an unattenuated state due to the upper mass M and the stiffness K. It may be identified that when vibration of about 22.5 Hz frequency is input to the suspension mount of the conventional internal combustion engine vehicle, a peak value is transmitted thereto due to resonance.

On the contrary, it may be identified that in the suspension mount structure of the electrified vehicle according to one embodiment of the present disclosure, a resonance point does not appear, and a ratio of an output vibration x to an input vibration y to is small in an entire frequency range of 0 to 200 Hz. That is, it may be identified that when the suspension mount structure of the electrified vehicle according to one embodiment of the present disclosure is applied, a ratio of vibration transmitted to the vehicle to vibration occurring at a portion below the vehicle to is significantly reduced, compared to the suspension mount structure of the conventional internal combustion engine vehicle.

Figure 4:
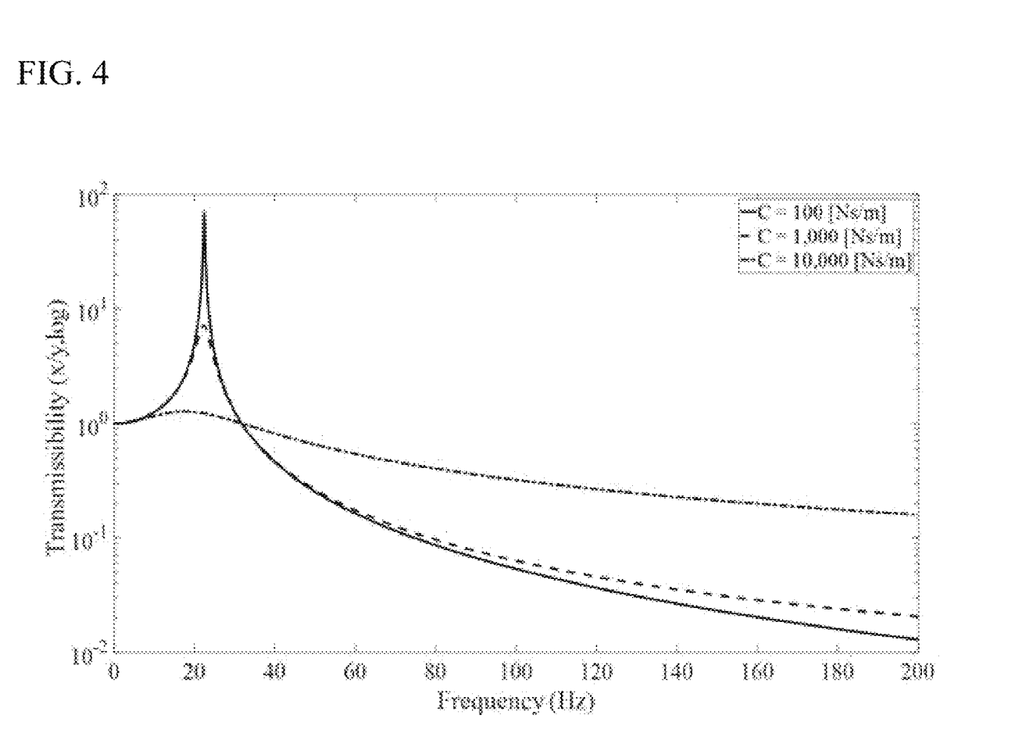
FIG. 4 is a diagram showing vibration transmissibility of a suspension mount structure of a conventional internal combustion engine vehicle based on change in a damping coefficient.
Figure 5:
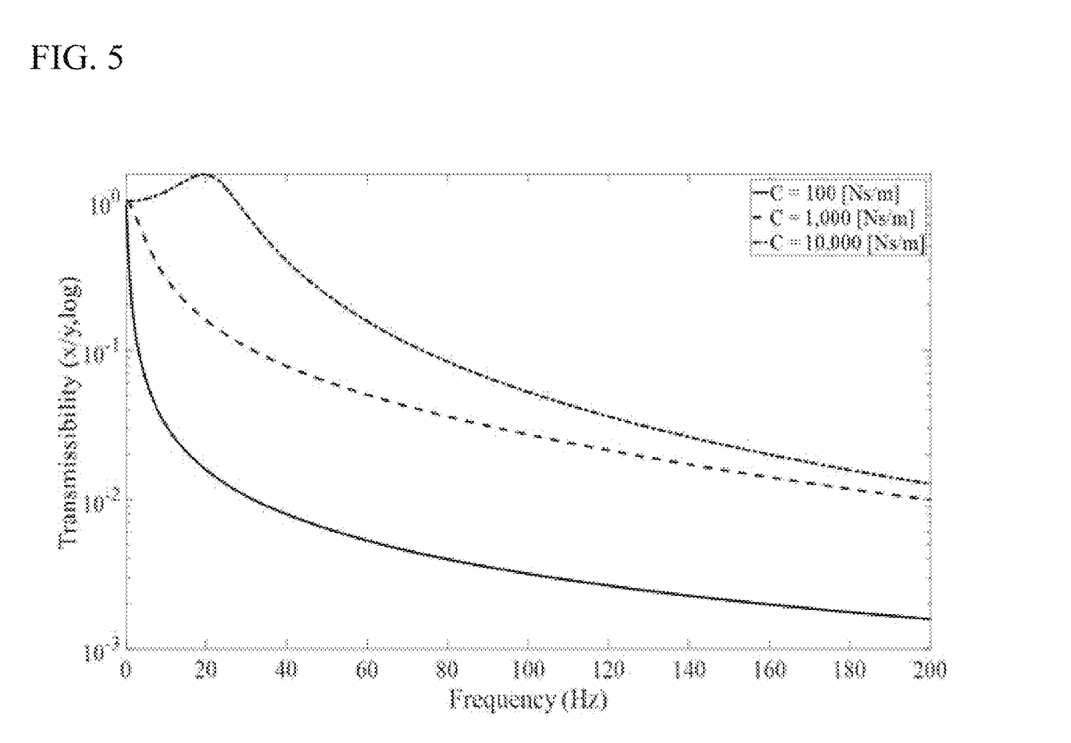
FIG. 5 is a diagram showing vibration transmissibility of a suspension mount structure according to the present disclosure based on change in a damping coefficient.

FIG. 4 is a view showing the vibration transmissibility of the suspension mount structure of the conventional internal combustion engine vehicle based on change in the damping coefficient. FIG. 5 is a diagram showing the vibration transmissibility of the suspension mount structure according to the present disclosure based on change in the damping coefficient.

FIG. 4 is a graph showing vibration transmissibility of the suspension mount of the conventional internal combustion engine vehicle as calculated while changing the damping coefficient C to each of 100 Ns/m, 1,000 Ns/m, and 10,000 Ns/m. FIG. 5 is a graph showing vibration transmissibility of the suspension mount of an electrified vehicle according to one embodiment of the present disclosure as calculated while changing the damping coefficient C to each of 100 Ns/m, 1,000 Ns/m, and 10,000 Ns/m. In the drawings of FIG. 4 and FIG. 5, an x-axis represents a frequency value of the input vibration, and a y-axis represents a vibration transmissibility value of the input vibration of the corresponding frequency. The vibration transmissibility is calculated when the equivalent mass M of the upper structure is set to 50 Kg and the stiffness coefficient K is set to 1,000 KN/m.

Referring to FIG. 4, it may be identified that in the suspension mount structure of the conventional internal combustion engine vehicle, the damping coefficient must be increased to reduce the vibration transmissibility. It may be identified that when the damping coefficient C is 100 Ns/m or 1,000 Ns/m, a peak value is transferred thereto due to resonance. On the contrary, it may be identified that when the damping coefficient C increases to 10,000 Ns/m, there is no resonance point in an analysis frequency range of 0 to 200 Hz.

Referring to FIG. 5, it may be identified that in the suspension mount structure of an electrified vehicle according to one embodiment of the present disclosure, as the damping coefficient C increases, the vibration transmissibility may be increased. It may be identified that when the damping coefficient C is a maximum value=10,000 Ns/m, a peak appears near a resonance point as in the suspension mount structure of the conventional internal combustion engine vehicle.

In order to increase the damping coefficient C, it is necessary to increase the damper performance. In this regard, to increase the damper performance, a high cost and a large space are required. Thus, in the suspension mount structure of the conventional internal combustion engine vehicle, a high cost and a large space are required to reduce a ratio of vibration transmitted to the vehicle to vibration occurring at a portion below the vehicle. On the contrary, in the suspension mount structure of the electrified vehicle according to one embodiment of the present disclosure, large reduction in the vibration transmissibility may be expected only with small damper performance, such that a suspension mount structure with minimum damper performance may be designed. That is, in the suspension mount structure of the electrified vehicle according to one embodiment of the present disclosure, a ratio of vibration transmitted to the vehicle to vibration occurring at a portion below the vehicle may be reduced with a low cost and a small space. Thus, a manufacturing cost of the vehicle and a required space, etc. may be minimized such that a compact design of the vehicle may be achieved.

Figure 6:
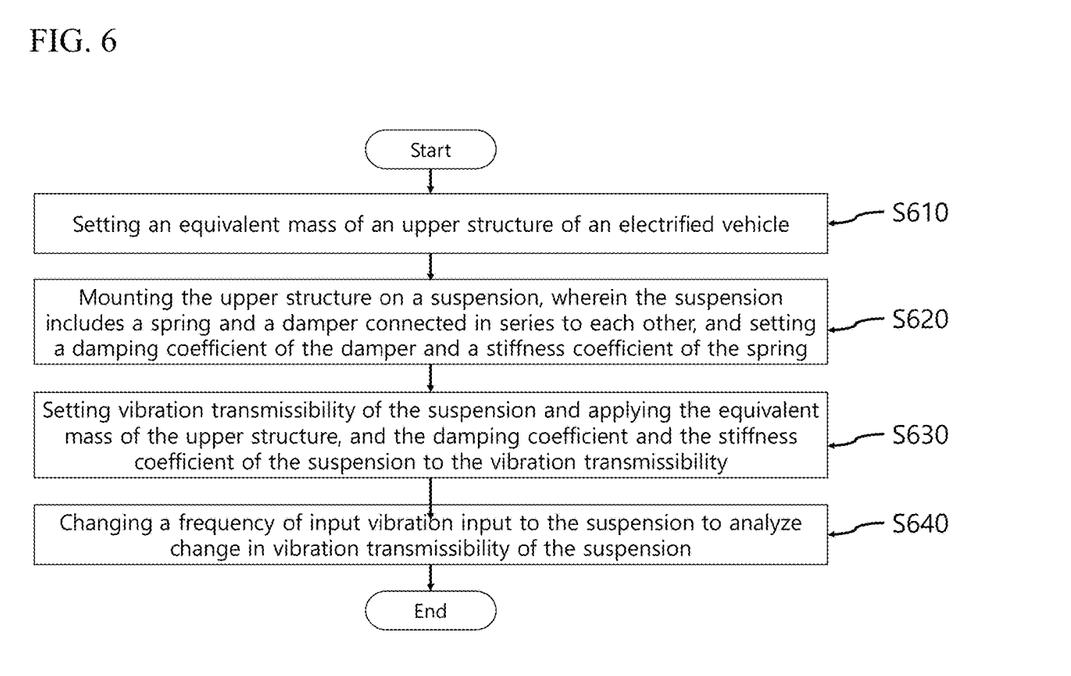
FIG. 6 is a flowchart for illustrating a method for evaluating performance of a suspension mount structure of an electrified vehicle according to one embodiment of the present disclosure.

FIG. 6 is a flowchart for illustrating a method for evaluating performance of a suspension mount structure of an electrified vehicle according to one embodiment of the present disclosure.

The method for evaluating the performance of the suspension mount structure of the electrified vehicle according to one embodiment of the present disclosure may be performed using an application or a program executed by a computer.

Referring to FIG. 6, the equivalent mass M of the upper structure of the electrified vehicle is set in S610, the vehicle upper structure is mounted on the suspension, and the damping coefficient C and the stiffness coefficient K of the suspension in which the spring and the damper are connected in series to the upper mount are set in S620. In one embodiment, the equivalent mass M, the damping coefficient C and the stiffness coefficient K may be set based on a user input.

When the vibration transmissibility of the suspension is set, the equivalent mass M of the upper structure, the damping coefficient C and the stiffness coefficient K of the suspension are applied to the vibration transmissibility in S630. In one embodiment, the vibration transmissibility may be determined based on a following Equation 5.

$$\frac{x(\omega)}{y(\omega)} = \frac{CK}{CK - MC\omega^2 - MK(\omega j)} \quad \text{(Equation 5)}$$

where w denotes an angular frequency=$2\pi f$ (f denotes frequency (Hz)), and j denotes a complex number.

The description about the Equation 5 is the same as that as described above with reference to the suspension mount structure of the electrified vehicle according to one embodiment of the present disclosure in the FIG. 2.

The equivalent mass M of the upper structure, the damping coefficient C and the stiffness coefficient K of the suspension are applied to the vibration transmissibility. Then, the frequency of the input vibration input to the suspension is changed and thus the change in the vibration transmissibility of the suspension is analyzed in S640. In one embodiment, an application or a program performing the performance evaluation method may display the analysis result as shown in FIG. 3 on a screen.

In one embodiment, analyzing the change in vibration transmissibility may further include changing the suspension damping coefficient C to analyze the change in the vibration transmissibility of the suspension. In one embodiment, the application or the program performing the performance evaluation method may display the analysis results as shown in FIGS. 4 and 5 on the screen.

The method for evaluating the performance of the electrified vehicle suspension mount structure as described above with reference to FIG. 6 may also be implemented in a form of a computer-readable medium including instructions executable by a computer, such as an application or module executed by a computer.

The computer-readable medium may be any available medium that may be accessed by a computer, and includes both volatile and nonvolatile media, or removable and non-removable media. Further, the computer readable medium may include both a computer storage medium and a communication medium. The computer storage medium includes both volatile and nonvolatile media, or removable and non-removable media implemented in any method or scheme for storage of information such as computer readable instructions, data structures, modules or other data. The communication medium typically includes computer readable instructions, data structures, program modules, or other data of a modulated data signal such as a carrier wave, or other transport mechanism, and includes any information delivery medium.

As used herein, the term "module" may mean hardware capable of performing a function or an operation according to each name as described herein, or may also mean a computer program code capable of performing a specific function or operation. In addition, the module may refer to an electronic recording medium, for example, a processor on which a computer program code capable of performing a specific function or operation is loaded.

A scope of protection of the present disclosure should be construed by the scope of the claims, and all technical ideas within the scope equivalent thereto should be construed as being included in the scope of the present disclosure. Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A suspension mount structure of an electrified vehicle, the suspension mount structure comprising:
   an upper structure of the electrified vehicle; and
   a suspension on which the upper structure is mounted, wherein vibration occurring at a location below the suspension is transmitted to the suspension via an axle and then is transmitted to the upper structure via the suspension,
   wherein the suspension includes a spring and a damper, wherein the spring and the damper are connected in series to each other and are connected in series to the upper structure,
   wherein vibration transmissibility of the suspension is determined based on a following Equation 1:

$$\frac{x(\omega)}{y(\omega)} = \frac{CK}{CK - MC\omega^2 - MK(\omega j)} \quad \text{Equation 1}$$

where M denotes an equivalent mass of the upper structure, C denotes a damping coefficient set for the damper, K denotes a stiffness coefficient of the spring, $\omega$ denotes an angular frequency ($=2\pi f$), and j denotes a complex number.

2. The suspension mount structure of claim 1, wherein the vibration transmissibility means a ratio of vibration transmitted to the upper structure above the suspension to vibration occurring at a location below the suspension, while vibration occurring at a location above the suspension is ignored.

3. A method for evaluating performance of a suspension mount structure of an electrified vehicle, the method comprising:
   setting an equivalent mass of an upper structure of the electrified vehicle;
   mounting the upper structure on a suspension, wherein the suspension includes a spring and a damper connected in series to each other;
   setting a damping coefficient of the damper and a stiffness coefficient of the spring;
   setting vibration transmissibility of the suspension;
   applying the equivalent mass of the upper structure, and the damping coefficient and the stiffness coefficient of the suspension to the vibration transmissibility; and
   changing a frequency of input vibration input to the suspension to analyze change in vibration transmissibility of the suspension.

4. The method of claim 3, wherein the vibration transmissibility of the suspension is determined based on a following Equation 1:

$$\frac{x(\omega)}{y(\omega)} = \frac{CK}{CK - MC\omega^2 - MK(\omega j)} \quad \text{Equation 1}$$

where M denotes an equivalent mass of the upper structure, C denotes the damping coefficient of the damper, K denotes the stiffness coefficient of the spring, $\omega$ denotes an angular frequency ($=2\pi f$), and j denotes a complex number.

5. The method of claim 3, wherein the analyzing of the change in the vibration transmissibility of the suspension further includes changing the damping coefficient of the suspension to analyze the change in the vibration transmissibility of the suspension.

* * * * *